Patented Sept. 27, 1932

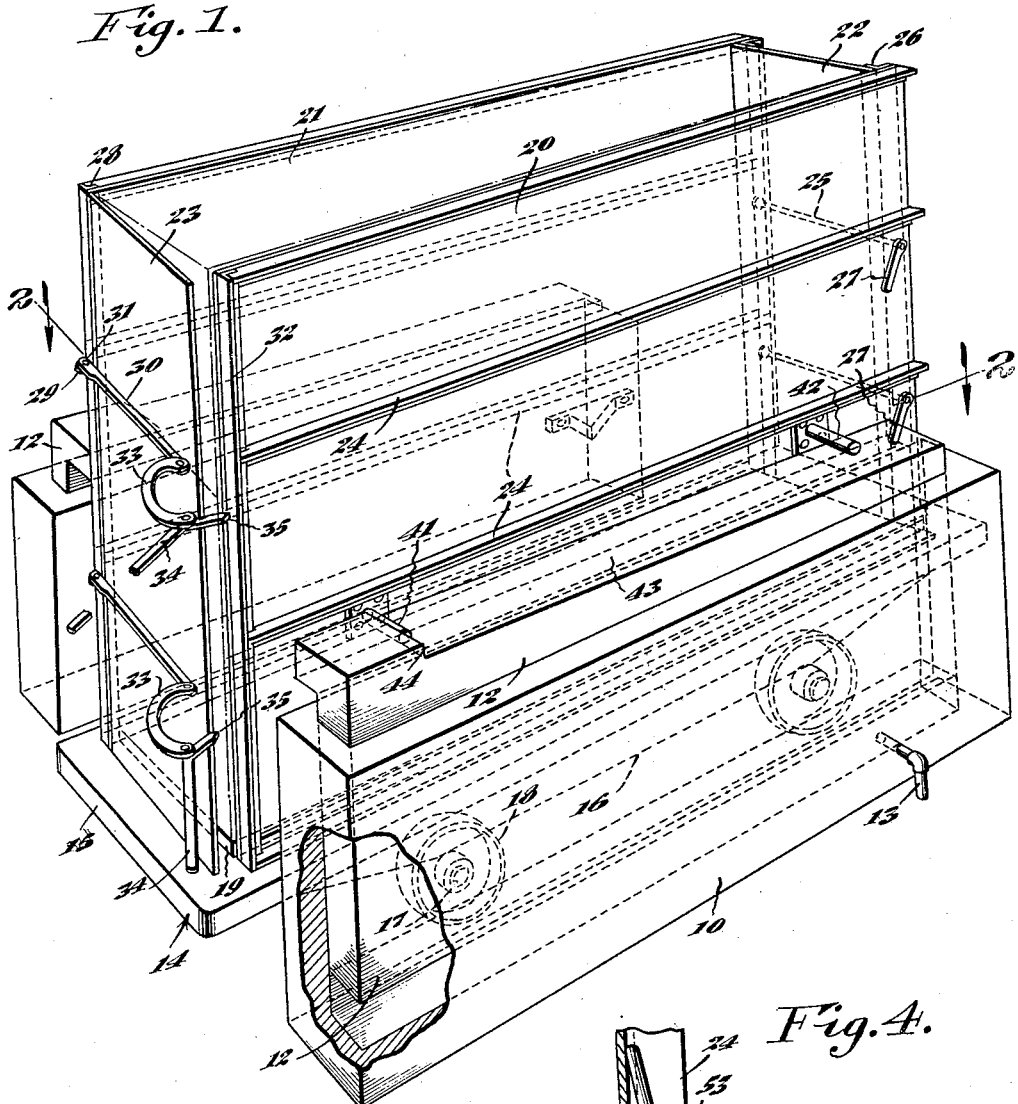
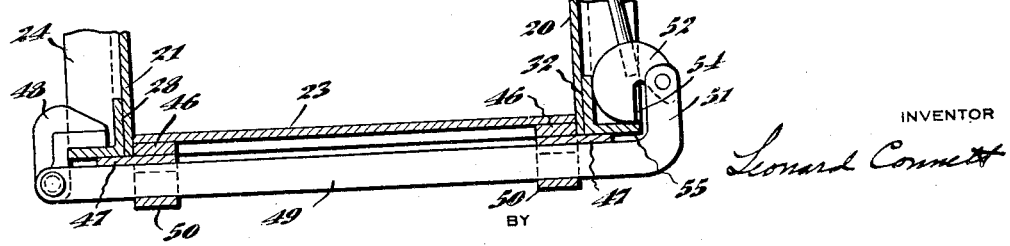

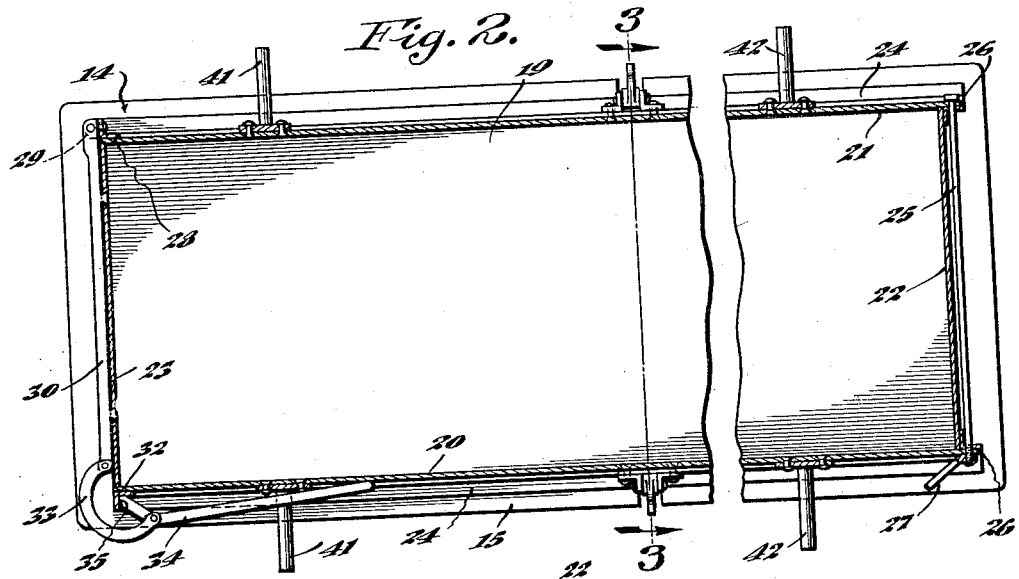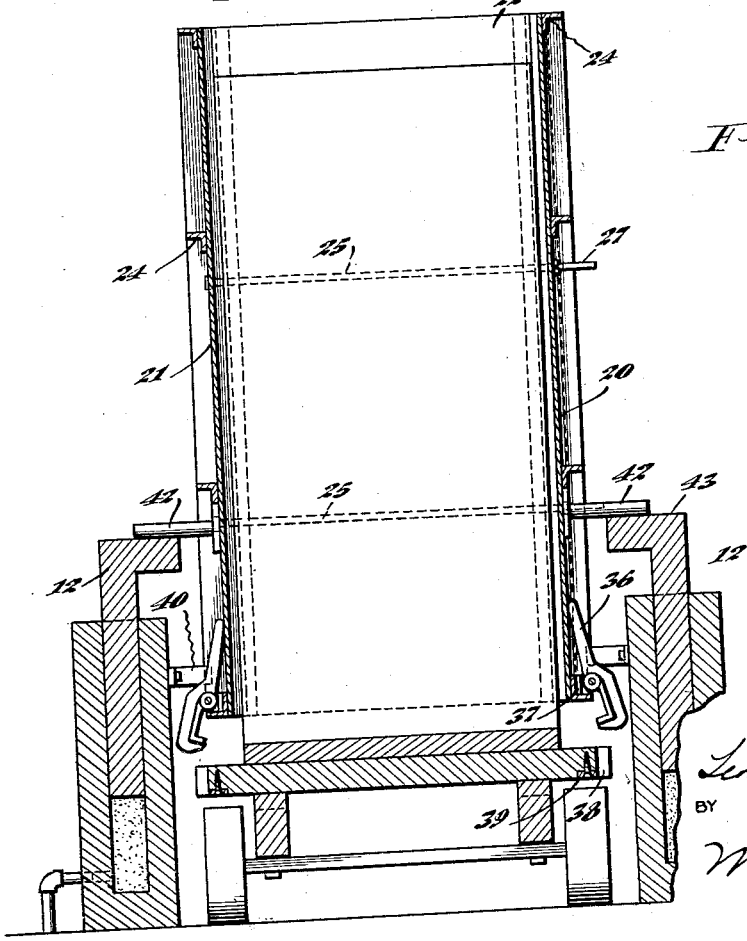

1,879,891

UNITED STATES PATENT OFFICE

LEONARD CONNETT, OF CINCINNATI, OHIO

MOLD AND METHOD OF REMOVING THE SAME FROM THE CAST MATERIAL

Application filed June 6, 1930. Serial No. 459,448.

This invention relates to soap molding equipment and is particularly directed to a soap mold for initially molding or setting a large crude block or cake of soap and to the device for stripping the mold from the block of soap. In soap forming operations the soap, after it has been stirred and beaten, is poured into a mold to solidify. These molds for initially setting the soap are relatively large for setting blocks or cakes approximating 1,500 pounds in weight. These large blocks of soap are permitted to set within the molds which are supported upon pallets or truck platforms so that after the molds surrounding the same are removed, the pallets or platforms support the blocks of soap until further time elapses or operations are performed upon them relative to the formation of the small finished bar of soap.

It has been common practice to provide a mold of collapsible design. After the soap is firmly set in the form of a block within the mold, the sides of the mold are removed by the workmen. The respective sides and ends of the structure are detachable at each corner and the respective sides and ends removed respectively laterally or endwise from the block of soap.

It follows that considerable time is consumed in stripping or removing this form of mold where each side and end must be handled separately. Furthermore, the labor entailed is unusually heavy since the sides of the mold for setting a block of soap weighing 1,500 pounds are necessarily heavy and only removed with the expenditures of a great deal of energy on the part of the workmen. After the mold is torn down to clear the block of soap, it is of course necessary to reassemble the same for the purpose of another molding operation and the workmen are then put to the same hard labor in setting up the mold or frame upon another platform or pallet.

Therefore, the broad fundamental object of this invention is to considerably reduce the amount of handling and labor necessary for a given soap setting operation and to furthermore totally eliminate the excessive hard labor necessary to accomplish the above described operations. The present invention proposes to totally dispense with manual handling of the frame or mold with the exception of minor operations incident to tripping a latching mechanism and opening one end of the mold.

In pursuance of the above object it is a further objective of this invention to provide an apparatus for stripping the mold from successive blocks of soap upon respective pallets or truck platforms as they are successively moved through the apparatus. To this end it is provided that the mold, having been stripped from a given block of soap and the block of soap, supported on its pallet or truck, removed from the vicinity of the apparatus, the mold is maintained suspended until an empty pallet or platform is placed beneath it and is thereafter lowered and deposited on the pallet whereupon simple manual operations completely set up the mold for a succeeding casting operation.

It is a further object in connection with this invention to provide that the stripping operation for removing the mold from about the large block of soap is highly efficiently accomplished due to the action of the stripping means in initially breaking the mold sides away from the block of soap before the mold elevating action. It is, therefore, also provided that great lifting power is not needed in the stripping operation.

It is another object of this invention to accomplish these stripping operations through the medium of power operated lift devices, which devices are capable of sustaining the empty mold until an unloaded pallet or truck is placed beneath the same.

It is another object of this invention to provide a soap mold which may be moved to amply clear the block of soap for removal of the block from the mold without separation of the parts, and in which the parts are always properly mated and which mold, therefore, requires no care on the part of the operator in remounting the same on an unloaded truck.

It is another object of this invention to provide an improved method of opening a mold and stripping the same from about a block of molded material wherein the mold opening operation is exceedingly simple and the mold lifting operation for removing the mold from the support is accomplished by a lifting pressure less than the weight of the solidified material within the mold thereby eliminating any possibility of disturbing the block of material from its position upon the pallet upon which it is to rest for a subsequent step in the process.

Other objects and certain advantages will be more fully apparent from the description of the accompanying drawings, in which:

Figure 1 is a perspective view of the invention illustrating a truck and mold disposed within the hoisting apparatus, the mold latches opened and the apparatus in connection with the mold just prior to the lifting operation for tilting and stripping the mold from the block of soap.

Figure 2 is a sectional view taken on line 2—2, Figure 1, detailing the studs extending from the sides of the mold furnishing the lift connection or contact points for elevating the mold and also illustrating the latching means for securing the swinging end of the mold in closed position.

Figure 3 is a sectional view taken on line 3—3, Figure 2, further detailing the mold and truck relative to the lifting apparatus and showing the clamps, securing the mold to the truck platform in tripped position.

Figure 4 is a fragmentary sectional view taken horizontally of the disconnectible corner and swinging end of the mold illustrating a modified form of latch.

Generally described, the lifting apparatus comprises spaced devices including cylinders and lifting plungers. The means for operating the plungers may be of any sort: manual, mechanical, pneumatic, or hydraulic. The truck or platform is moved between the respective devices and the mold having the solidified block of soap therein includes laterally extending projections which are then disposed in the path of movement of the plungers. The mold has one end hinged at one side edge and its opposite edge latched to the opposite side.

Initially after placement of the mold between the devices the latches are sprung and the sides are pried away from the soap, the end then being swung into alignment with one of the sides so that the block of soap can be drawn from between the devices and out the open end of the mold. The lifting plungers engage the lateral projections of the mold and elevate the entire mold after it has been initially opened. This lifting movement strips the mold from the block of soap and the operator is then able to draw the platform or truck having the block of soap standing thereon through the open end of the mold.

For a clear understanding and specific description of the construction of the entire lift apparatus, mold and truck reference is had to the drawings. The cylinders 10 of the respective devices constituting the hoisting and stripping apparatus are attached in spaced relation to the floor of the factory. These cylinders are elongated in form extending substantially the length of the truck or mold which is moved between them. The plungers or pistons 12 of the cylinders are also of elongated form and have inwardly extending ledges along their upper ends for insuring engagement under the projections or studs of the mold.

The pistons may be of any form within the cylinders provided their upper ends afford the proper length for engagement with the studs of the mold. It will be understood that the pistons may be actuated by any desirable means. In the present instance a hydraulic or pneumatic means is illustrated consisting of a line of piping 13 extending up through the floor into the side of each cylinder and communicating with the lower end of the bore of the cylinder.

The support for the mold is illustrated in the form of a truck 14, the platform 15 of which supports a pallet for the block of soap and constitutes the bottom for the mold. The truck includes the platform 15 mounted on longitudinal bolsters 16 on axles 17—17, one toward each end of the bolsters, supported upon wheels 18—18 at their respective ends. The platform has a raised portion thereon formed by a rectangular slab constituting the pallet 19 of lesser dimension than the rectangular platform and secured thereto so that an abutment is provided by the edges of the slab or pallet against which the sides of the mold are engaged. The surface of the platform, therefore, extends beneath the mold for sustaining the same.

The mold comprises a pair of sides 20, 21 and a pair of ends 22, 23 forming a rectangular molding space when set up. These wall elements of the mold are formed of plate steel. The sides are reenforced by means of longitudinally extending angle iron strips 24. The end plate 22 is permanently fixed in position between the sides and abuts the end edge of the slab supporting the block. This end plate is secured between the sides by means of draw bolts or tie rods 25 extending between the respective sides. For the purpose of this attachment, the end plate has angle iron strips 26 secured along the vertical edges thereof on the outside. The extending flanges of these strips abutting the side walls of the mold are traversed by the tie rods. The tie rods are secured by means of handles 27 screw threaded on the ends thereof and abutting the outer face of a side. These tie rods bind the one end of the mold together. Due to the use of the tie rods, however, there is some flexibility permitted so that the opposite end of the mold may be spread without difficulty although if more flexibility is needed the handles may be loosened.

The opposite end wall 23 of the mold is hinged at one vertical edge and latched at the other. For the purpose of the hinge, an angle iron strip 28 is secured along the outer vertical end edge margin of a side wall 21. This strip has hinge lugs 29—29 extending from its outward flange. Each of these lugs supports one end of a respective hinge bar 30 or reenforcing element riveted to the end wall 23. The ends of these bars 30 are attached to the hinge lugs by means of hinge pins 31.

The opposite vertical edge of the end wall abuts the inner vertical edge of the opposite side wall 20. The vertical edge of the side wall 20 to which the swinging end is latched also has an angle iron strip 32 extending along the same. The ends of the reenforcing or hinge bars of the door or swinging end of the mold have semicircular links 33 pivotally attached thereto. The outer ends of the links carry latches 34 fulcrumed thereon and having slightly angled ends. The connection of the links to the latches is at the angular turn of the same.

As shown in Figure 2, the hinged end of the mold is swung closed into abutment along its lower edge with the pallet or base of the mold and the pointed inner ends 35 of the latches are inserted within the vertical angle iron strips. Thereupon, the handles of the latches are swung in against the side of the mold, (see Figure 2) this drawing the sides of the mold against the swinging end wall and binding the same in position with its outer face flush with the vertical edges of the side walls.

It will be apparent from Fig. 3 that the lift devices are sufficiently spaced apart to clear the sides of the mold for permitting some manually accomplished lateral displacement or spreading of the sides from about the molded block of soap.

For the purpose of securing the mold to the platform of the truck, clamping or latching devices 36—36 are provided, one at each side of the mold. Each of these devices is pivoted to a lower angle iron bar 24 on the respective sides by means of a bracket 37. The lower end of the device includes a hook portion engageable under the platform moving into a slot 38 in the platform side edge. A shoe 39 on the under side of the platform provides a firm bearing for the hook. The engagement of the hook under the platform firmly clamps the mold in place on the platform. The upper end of each device is extended to provide a lever or operating end.

As the truck is moved between the releasing devices it is provided that the latching devices 36 are automatically released or unhooked in order that the mold may be removed from the truck platform at a subsequent time. This release of the latching devices is accomplished by means of inclined trip blocks 40 secured to the inner faces of the respective cylinders 10 toward that end into which the truck is initially moved. These blocks have their inclined faces extending inwardly from the truck entry end and are disposed at the proper elevation for engaging the lever ends of the clamps thereby swinging the same inwardly and tripping the clamps as they are carried by the truck in engagement along the inclined surfaces.

Each of the sides has two studs 41, 42 affixed thereto, these studs being of sufficient length to firmly engage upon the tops of the lifting plungers. The studs are disposed at a predetermined elevation which is such that, as the truck is moved between the lifting devices, these studs will be properly disposed to move clear of the plunger when it is in its lowered position.

To facilitate the stripping operation the upper surfaces 43 of the plungers are inclined to provide high points toward the forward ends thereof or toward the latched end of the mold and slightly lower points toward the rear. Furthermore, to definitely stop and position the mold as moved between the lifting devices, the plungers are provided with shoulders 44 toward their forward ends, which shoulders are adapted to be abutted by the forward studs 41 as the platform truck and mold are moved between the devices.

As the lifting plungers are elevated, it will be apparent that the forward studs 41 are engaged first and the lifting effect takes place primarily at the forward end of the mold. This rocks the mold sides on the studs or trunnions 41 and the rear end 22 on its lower edge thereby moving the upper edge of the rear end of the mold away from the block of soap and initially stripping the rear end of the mold from the block of soap. At the same time the sides of the mold are swung transversely of the sides of the block of soap thus breaking any remaining adherence between the sides of the mold and the block of soap by a twisting action.

After this initial engagement of the forward trunnions, the rear studs 42 are engaged and lifting of the entire mold occurs. The pressure exerted by the lifting plungers is generally around one thousand pounds and is always less than the weight of the block of soap so that the block of soap can at no time be raised from the platform.

A modified form of end wall 23 and latching means is illustrated in Figure 4. The wall in this instance consists of a steel plate having lengths of strap iron 46 extending around its outer edge margin. Abutment strips 47 of strap iron are attached on the aforesaid straps and extend out to overhang the ends of the mold sides and the vertical angle iron pieces 28, 32. This wall is mounted on hinges 48 secured to the vertical angle iron strip 28 of the side wall 21. The hinge connection or attachment means for the door is in the form of bars 49 extending across its face and attached thereto by means of clips 50, the ends of the bars being connected to the hinges. The opposite ends of the bars extend beyond the side of the mold and are turned at right angles along the side of the mold as at 51.

Discs 52 are eccentrically pivoted to the angled ends 51 of the bars and are positioned, when the end wall is in closed position, to be swung into contact with both the inner walls of the vertical angle iron 32 of the wall 20. These discs are swung on their pivots by means of levers 53 socketed radially in the discs. The discs have a segmental notch 54 cut out so as to clear the extending flange 55 of the vertical angle iron 32 as the end wall is swung into closed position. It will be understood that the two point frictional engagement of each disc with the flanges of the angle iron when the operating levers are swung against the side of the mold securely binds the end wall in position, the end wall fitting between the sides and having its overhanging strips 47 abutting the ends and the vertical angle iron strips 28, 32 as heretofore described.

The operation of the devices herein described is as follows. The soap is poured into the fully closed mold and is permitted to set within the mold for a period sufficient to firmly solidify the soap. This mold being disposed upon the platform which constitutes the bottom for the mold is moved between the lifting devices of the mold stripping apparatus until the forward trunnions engage the abutment shoulders of the plungers. The clamps or latches securing the mold to the platform have been released during entry of the platform between the lifting devices. Thereupon the operator releases the end wall clasps or latches and swings the end wall of the mold into alignment with the side to which it is hinged. The sides are then pried away from the block of soap.

After these manual operations the hoists or lifting devices are simultaneously operated to lift the entire mold from the truck. The swinging action is imparted in the mold as previously described for initially breaking or stripping the mold from the block of soap. After the mold is lifted the extent of upward travel of the plungers, the truck is pulled from the forward end of the apparatus and the block supported thereon passes from between the cleared sides and out the forward end of the mold and is moved away for subsequent operations.

The mold held suspended upon the pistons is afterwards lowered upon an unloaded truck and the sides are bound together about the bottom of the mold or the pallet on the truck by means of the clasps at the forward end. Thereupon the truck is moved out through the rear end of the apparatus, the clamps 36 set to secure the mold to the truck, and the apparatus is ready for operation upon a succeeding loaded or filled mold.

The foregoing operations obviously require extremely little labor. Manual lifting operations are totally eliminated and the independent handling of the separate sides is abolished. The mold is always in connected condition so that each mold is an independent unit, the walls of which are permanently affixed together.

Having described my invention, I claim:

1. A mold stripping apparatus, comprising, a platform, a mold frame mounted on said platform, hoisting devices mounted in spaced relation so as to permit the movement therebetween of the mold and platform, each of said hoisting devices including a cylinder and a piston, means for elevating said pistons, the sides of said mold having extensions engageable by said pistons whereby the mold frame may be elevated and stripped from the cast block within the same, and one of the ends of the mold movable to clear the end of the mold whereby the platform and block of soap may be drawn endwise out of the mold.

2. A mold stripping apparatus, comprising, a platform, a mold frame mounted on said platform, hoisting devices mounted in spaced relation so as to permit the movement therebetween of the mold and platform, means on said mold engaged by said hoisting devices whereby the mold frame may be elevated and stripped from the cast block within the same, and one of the ends of the mold having a hinged connection for clearing the end of the mold whereby the platform and block of soap may be drawn endwise out of the mold.

3. In a mold apparatus, a platform support constituting a bottom for the mold, a mold frame mounted on said platform, the corners of said mold permanently joined with the exception of one corner, means for detachably connecting said latter corner whereby an end of the mold may be swung clear and the sides of the mold spread, and hoisting devices for lifting and stripping said mold from the molded material.

4. In a mold apparatus, a platform constituting a bottom for a mold, a mold frame mounted on said platform, the corners of said mold permanently joined with the exception of one corner, means for detachably connecting said latter corner whereby an end of the mold may be swung clear and the sides of the mold spread, and hoisting devices for lifting and stripping said mold from the cast material, said hoisting devices initially engaging the opened end of the mold for rocking the mold on its closed end lower edge.

5. In a device of the class described, a platform constituting the bottom of a mold, a mold frame mounted on said platform, said mold frame detachably joined at one corner, means for locking said corner, lifting devices including cylinders and pistons of elongated form extending substantially the length of the sides of said mold, a pair of studs extending from each side of the mold in the same plane, one of each pair on each side disposed toward the respective ends of the sides, the engaging upper surface of the pistons inclined, the high ends thereof being disposed toward the detachable end of the mold whereby the opened end of the mold is elevated first, and the entire mold is eventually elevated by means of the lifting pistons for stripping the mold from the molded material.

6. The combination of a mold, a platform support constituting the bottom for said mold, and hoisting devices, said hoisting devices spaced apart for permitting the insertion and the passage of the mold therebetween, and means on said mold engageable by said hoisting devices whereby the mold may be elevated from the platform and supported by the hoisting devices for disposition on a next succeeding support inserted therebeneath.

7. In combination, a mold and spaced hoisting devices, between which hoisting devices said mold is adapted to be moved, said mold including side walls, end walls and a bottom, clamps at each side of said mold securing said sides to the bottom, and elements engaged by said clamps as the mold is moved between said hoisting devices for tripping and releasing said clamps.

8. In a mold construction, a support, a pallet of lesser dimension than the support fixed to its upper surface, mold sides and ends having their lower edges abutting said pallet and supported on said support, one end of said mold hinged to a side, a link pivoted to the swinging edge of said end, a lever fulcrumed on the outer end of said link, an angle iron strip disposed along the adjacent vertical edge of the side, said lever having a point adapted to be engaged in the inner corner of the angle iron strip whereby the outer end of the lever may be swung toward the side of the mold for drawing the hinged end into closed position.

9. In a mold construction, side walls, end walls, one end wall hinged to a side wall, a latch member pivotally connected to the swinging edge of the end wall, an angle iron strip disposed along the vertical adjacent edge of the side wall of the mold, and means for swinging said latch element to engage the inner sides of the angle iron strip whereby the hinged end wall may be locked in closed position.

10. The method of stripping and removing a mold supported on a platform from about the molded material, comprising, opening one end of the mold, spreading the side walls at the open end, raising the mold initially at its open end to rock the same on its closed end lower edge, elevating the entire mold, and thereafter drawing the molded material through the open end whereupon an unloaded support may be placed under the mold.

11. A method of stripping a mold from about a molded block of material, comprising, initially opening one end of the mold and wedging the sides away from the block of material and thereafter hoisting the mold by means of a lifting pressure less than the weight of the block of material cast in the mold.

12. A method of stripping a mold from about a cast block of material, consisting of, opening one end of the mold, spreading the sides of the mold from the block, elevating the open end of the mold first so as to rock the mold on its rear edge and individually strip the rear end wall from the block, and thereafter to completely elevate the entire mold from the support upon which the block rests.

13. A method of stripping a mold from about a molded supported block of material, comprising, opening the mold and thereafter hoisting the mold from the support by means of a lifting pressure less than the weight of the block of material cast in the mold.

14. The combination of a mold, a platform support constituting the bottom for said mold, and hoisting devices, said hoisting devices spaced apart for permitting the insertion and the passage of the mold therebetween, means on said mold engageable by said hoisting devices whereby the mold may be elevated from the platform and supported by the hoisting devices for disposition on a next succeeding support inserted therebeneath, and abutments on said hoisting devices engaged by said mold as the mold is moved between the hoisting devices whereby its position between the hoisting devices is definitely determined.

In witness whereof, I hereunto subscribe my name.

LEONARD CONNETT.